US00H002145H

(19) United States
(12) Statutory Invention Registration
Bennett

(10) Reg. No.: US H2145 H
(43) Published: Feb. 7, 2006

(54) MITIGATING IGNITION OF FLUIDS BY HOT SURFACES

(75) Inventor: Joseph M. Bennett, Huber Heights, OH (US)

(73) Assignee: The United States of America as represented by the Secretary of the Air Force, Washington, DC (US)

(21) Appl. No.: 09/664,976

(22) Filed: Sep. 18, 2000

Related U.S. Application Data

(60) Provisional application No. 60/220,226, filed on Jul. 24, 2000.

(51) Int. Cl.
*B32B 3/10* (2006.01)

(52) U.S. Cl. ..... 428/131; 428/167

(58) Field of Classification Search ..... 428/131, 428/167, 169, 312.2, 312.8, 920, 921; 248/554
See application file for complete search history.

(56) References Cited

U.S. PATENT DOCUMENTS 3,584,972 A * 6/1971 Bratkovich et al. .... 29/889.721
4,076,100 A * 2/1978 Davis ..... 181/290
5,181,379 A * 1/1993 Wakeman et al. ..... 60/753
5,297,765 A * 3/1994 Hughes et al. ..... 244/130
5,465,572 A * 11/1995 Nicoll et al. ..... 60/266
5,558,922 A * 9/1996 Gupta et al. ..... 29/889.1
5,721,402 A * 2/1998 Parente ..... 181/214
6,068,882 A * 5/2000 Ryu ..... 427/246
6,322,873 B1 * 11/2001 Orologio ..... 428/178
6,383,608 B1 * 5/2002 Burkett et al. ..... 428/173

OTHER PUBLICATIONS

J. Michael Bennett "Analysis of the Mechanisms of Pool Boiling and Ignition on Heated Surfaces and Proposed Mitigation Techniques" Aug. 1, 2000.*

* cited by examiner

*Primary Examiner*—Aileen Felton
(74) *Attorney, Agent, or Firm*—Bobby D. Scearce; Thomas L. Kundert

(57) ABSTRACT

A platform, housing, conduit, exhaust duct or other structural element that encloses or supports a hot operating engine or other machinery is described wherein a pattern of micro-cavities is defined on the outer surface of the structure for mitigating ignition of a flammable liquid that comes into contact with the structure, the micro-cavities being sized to minimize seepage into the cavities of the liquid because of its surface tension, thereby preventing wetting of the interior of the cavities by the liquid.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MITIGATING IGNITION OF FLUIDS BY HOT SURFACES

CROSS-REFERENCE TO RELATED APPLICATION

This application claims priority of the filing date of Provisional Application Ser. No. 60/220,226 filed Jul. 24, 2000, the entire contents of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for suppressing machinery fires, and more particularly to an economical, lightweight and reliable structure for mitigating the ignition of a flammable fluid leaked from the machinery onto a hot surface.

Powdered machinery may operate at very high exterior temperatures as a result of internal combustion or electrical power, grinding or machinery operations, friction or other causes that characterize the operation. In particular, surfaces near the combustion region, exhaust manifolds, or bleed air/steam ducts of an operating engine can reach extremely high temperatures. Flammable fluids such as fuel, oil or hydraulic fluid in use near such surfaces leaking onto the hot surfaces and igniting has been documented as a frequent cause of fires near hot operating machinery, especially in automobiles. Aboard aircraft, a common cause of engine fires is the leakage of such fluids in the engine nacelle and subsequent ignition of the fluid by the hot engine core or uninsulated bleed air ducts. On-board fire extinguisher systems may be rendered ineffective if the fire is re-ignited by the hot surface after the extinguishant is depleted.

The invention solves or substantially reduces in critical importance problems in the prior art by providing a platform, housing, conduit, exhaust duct or other structural element that encloses or supports an engine (or other hot operating machinery) and which are heated in the course of engine operation, for mitigating ignition of flammable liquids that come into contact with such heated structure. A pattern of micro-cavities is defined on the outer surface of the structure and sized to minimize flammable liquid seepage into the cavities because of surface tension of the liquid, thereby preventing wetting of the interior of the cavities by the liquid. A gridwork of the cavities on the surface of the structure may provide 50% or more reduction of direct surface to liquid contact when the liquid spreads across the surface, which minimizes heat transfer to an vaporization and ignition of the liquid. The cavities also promote formation of nucleate bubbles at the onset of boiling that percolate harmlessly through the liquid, rather than form a superheated vapor film beneath the liquid that could seep from under the liquid pool, mix with air and ignite. The cavity pattern may be formed in the structure surface by machining, stamping, rolling, casting or other conventional process. The invention allows substantially hotter operating surface temperatures for the engine, or delays ignition of flammable liquids contacting the structure, and thereby allows a wider range of operating temperatures for the engine safe from the risk of fire. The invention adds no weight to the machinery, is highly reliable and adds no operating cost after initial fabrication. The invention may be conveniently incorporated into bleed air ducts and engine surfaces of aircraft engines and auxiliary power units, military ground vehicle and ship engine or other machinery compartments, commercial vehicles, marine vessels, ground support and stationary power equipment and other industrial machinery applications where liquid-fueled, oiled or hydraulically controlled equipment is operated near hot components of operating machinery.

It is therefore a principal object of the invention to provide structure and method for suppressing machinery fires.

It is another object of the invention to provide a novel structure for a platform, housing, conduit or other structural form for a hot operating engine, machinery or other hot component.

It is another object of the invention to provide a novel structure for a platform, housing, conduit or other structural form that enclose or support a hot operating engine, machinery or hot component and which mitigate the ignition of flammable liquids contacting the structure.

It is a further object of the invention to provide an inexpensive, maintenance free system for suppressing fires near hot operating machinery.

It is a further object of the invention to provide a means of preventing fires near hot structures without adding additional weight to the structure.

It is a further object of the invention to provide a means to mitigate hot surface-induced ignition of fluids without reducing the ability of the hot structure to expel excess heat under normal operating conditions.

These and other objects of the invention will become apparent as a detailed description of representative embodiments proceeds.

SUMMARY OF THE INVENTION

In accordance with the foregoing principles and objects of the invention, a platform, housing, conduit, exhaust duct or other structural element that encloses or supports a hot operating engine or other machinery is described wherein a pattern of micro-cavities is defined on the outer surface of the structure for mitigating ignition of a flammable liquid that comes into contact with the structure, the micro-cavities being sized to minimize seepage into the cavities of the liquid because of its surface tension, thereby preventing wetting of the interior of the cavities by the liquid.

DESCRIPTION OF THE DRAWINGS

The invention will be more clearly understood from the following detailed description of representative embodiments thereof read in conjunction with the accompanying drawings wherein.

DETAILED DESCRIPTION

Theoretical considerations and underlying principles of operation of the invention may be found by reference to "*Analysis of the Mechanisms of Pool Boiling and Ignition on Heated Surfaces and Proposed Mitigation Techniques*," J. Michael Bennett, UDR-TR-98-00159, (Aug. 1, 2000), the entire teachings of which are incorporated by reference herein.

Figure 1:
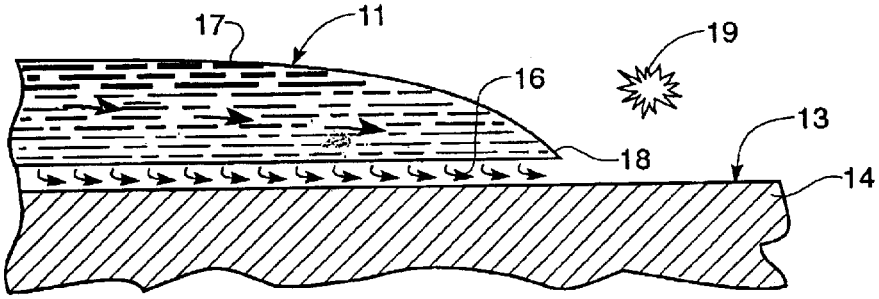
FIG. 1 is a schematic sectional view of a flammable liquid spreading over a heated surface.

Referring now to the drawings, FIG. 1 is a schematic sectional view of a pool of a flammable liquid 11 spreading over a heated surface 13 of a structural element 14. If the temperature of surface 13 exceeds the boiling point temperature of liquid 13, a thin vapor barrier 16 may form between surface 13 and liquid 11 as a result of film boiling. The separation between surface 13 and liquid 11 has the beneficial effect of reducing direct conductive heat transfer from surface 13 to liquid 11, which in turn limits liquid 11 evaporation at outer surface 17 and limits the mixing of sufficient vapor with air to result in ignition. However, because vapor barrier 16 is adjacent heated surface 13, superheating of barrier 16 results while it is entrapped under liquid 11 until the vapor migrates from under liquid 11 at the leading edge 18 of the pool and there mixes with air and easily ignites at 19. The pre-heated vapor requires a lower surface temperature (and resultant air temperature above at the point of ignition) to successfully ignite.

In accordance with a governing principle of the invention, reduced conduction heat transfer from the heated surface to the liquid due to techniques to minimize direct surface-to-liquid contact area mitigates vaporization of a sufficient vapor concentration at the liquid's outer surface for ignition, while preventing formation of a vapor film barrier that permits the superheating of the vapor prior to mixing with air.

Figure 2:
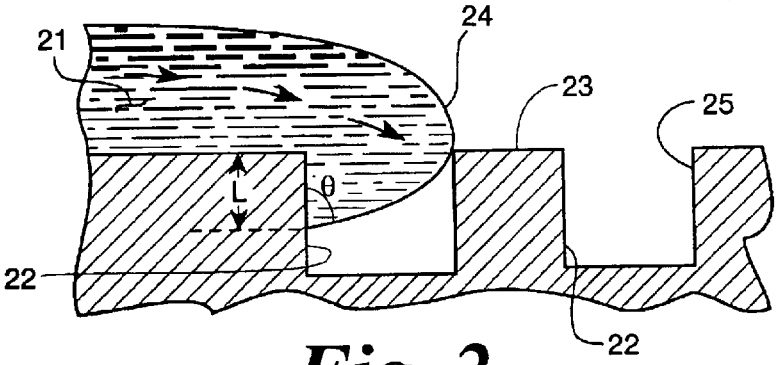
FIG. 2 is a schematic sectional view of a flammable liquid spreading over a heated surface having micro-cavities formed in the surface according to a governing principle of the invention.

Referring now to FIG. 2, shown therein is a schematic sectional view of a flammable liquid 21 spreading over a heated surface 23 having a pattern of micro-cavities 22 formed in surface 23 according to the invention. The width of each micro-cavity 22 is sized according to the surface tension and resultant contact angles of liquid 21 to minimize seepage of liquid 21 into cavities 22. A controlling consideration in the sizing of micro-cavities 22 is the contact angle between the heated surface 23 and the liquid 21. Within some broad ranges of cavity 22 sizes, therefore, the cavity size must be determined in consideration of the flammable liquid 21 which is anticipated to come in contact with heated surface 23. The contact angle θ between liquid 21 and the wall surface of micro-cavity 22 is characteristic of the balance between the surface adhesion and gravitational forces acting on liquid 21, and may be different for each liquid 21, surface 23 material, and temperature, all of which results in the leading edge 24 of the advancing liquid 21 film taking a form as suggested in FIG. 2 such that the mouth 25 of micro-cavity 22 is sealed off before micro-cavity 22 is entirely filled with liquid. The effective contact angle θ may be larger than normal due to the distorted shape (bulge) of the advancing leading edge 24 as a result of the momentum of the moving liquid 21 film. For example, the contact angle θ of n-heptane (a representative fuel) in contact with polytetrafluoroethylene (TEFLON) is about 22°, and is somewhat smaller for metallic surfaces. The angle θ for a given combination of liquid 21 and surface 23 must therefore be determined or approximated individually.

Figure 3:
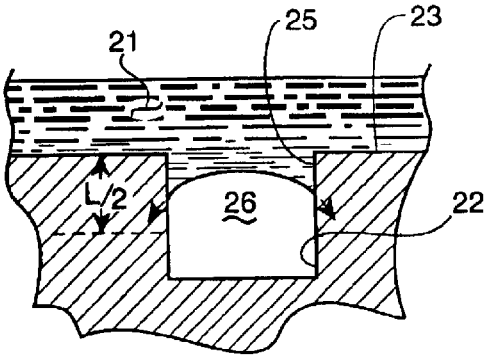
FIG. 3 shows a schematic sectional view of a micro-cavity of the invention in a heated surface illustrating trapped vapor generated within the micro-cavity beneath the flammable liquid.

Referring now to FIG. 3, shown therein is a schematic sectional view of a micro-cavity 22 with liquid 21 covering thereover with trapped vapor 26 generated within micro-cavity 22 under the covering layer of liquid 21. After liquid 21 initially seals off micro-cavity 22, liquid 21 will stabilize to a level L/2 roughly one half of the initial seepage depth L of the advancing leading edge 24 (FIG. 2), with the surface tension/wetting force and hydrostatic pressure of liquid 21 above balanced by the pressure of trapped vapor 26 within cavity 22 (FIG. 3). For a cylindrical cavity, geometrical considerations show that the cavity 22 depth should be no less than about (T/2)tan θ, where T is the diameter of cavity 22. For example, for a contact angle θ of 30°, a 0.5 mm diameter cavity 22 would require minimum depth of about 0.433 mm, and a 0.25 mm diameter cavity would require a cavity 22 depth of about 0.217 mm. As a general proposition, acceptable cavity 22 sizes in contemplation of the invention fall in the range of up to a few millimeters in width or diameter and depth for most flammable liquids 21, the specific sizing of the cavity determined according to the viscosity of the contacting liquid.

Micro-cavities 22 may be distributed over any selected portion of heated surface 23, and may be impressed onto surface 23 by any suitable production process known in the applicable art, including forging, casting, rolling or automated machining process such as laser or hot electrode milling, the specific process selected for any particular application not considered limiting of the invention.

A principal feature of the invention is the minimization of heat transfer from hot surface 23 to flammable liquid 21 as a consequence of less than total liquid 21 to surface 23 contact resulting for a portion of the liquid 21 film being suspended over cavities 22, and heat transfer occurring only from vapor 26 within cavities 22, vapor 26 having substantially smaller heat conductivity than hot surface 23 of the structure. If a substantial portion of the surface 23 area contains cavities 22, a significant decrease in heat transfer from surface 23 to liquid 21 results, and a hotter surface 23 would be required to cause ignition, and a wider range of safe operating conditions for the structure results. For cavities 22 of very small diameter in a densely packed arrangement, a minimal quantity of liquid 21 will contact and be heated by the cavity walls.

Figure 4:
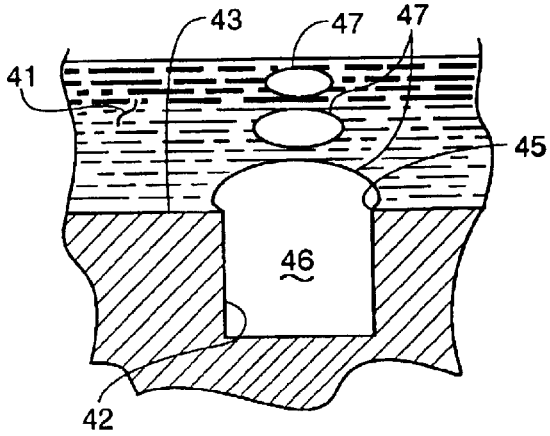
FIG. 4 shows a schematic sectional view of a micro-cavity of the invention in a heated surface illustrating percolation of vapor bubbles through the flammable liquid.

Referring now to FIG. 4, shown therein is a schematic sectional view of a micro-cavity 42 of the invention in a heated surface 43 illustrating another feature of the invention in the percolation of vapor 46 bubbles 47 through flammable liquid 41. Vapor 46 entrapped within cavity 42 is heated by the hot cavity 42 walls, expands, pushes liquid 41 out of cavity 42 and forms a bubble at mouth 45 of cavity 42. When bubble 47 expands sufficiently to break free of cavity mouth 45, it percolates upward through liquid 41. The liquid 41 pool is generally sub-cooled (below boiling), and therefore cools bubbles 47 and harmlessly dissipates the heat within liquid 41. The repetitive formation and release of bubbles 47 is similar to nucleate boiling, and promotes the release of vapor 46 formed at the solid surface/liquid interface rather than the formation of a vapor film that has been identified as a means of sustained superheating of vapor which migrates to the liquid 41 pool edge and ignites.

Figure 5:
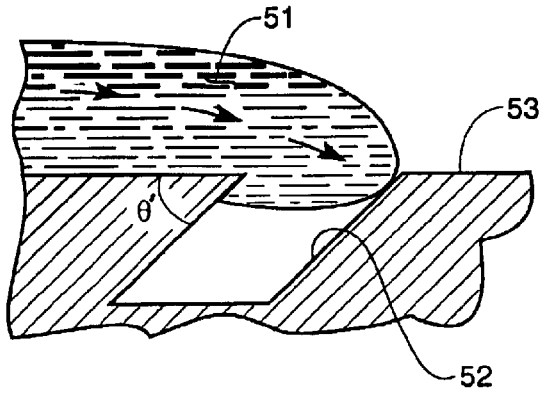
FIG. 5 shows a schematic sectional view of a representative micro-cavity shape according to the invention.

Referring now to FIG. 5, it is seen that the invention also contemplates micro-cavity shapes other than right circular cylinders or grooves oriented normal to the surface. Any shape for the micro-cavities would be acceptable as would occur to the skilled artisan practicing the invention so long as the surface tension of the contacting liquid substantially prevents seepage into the cavity. For example, cavity 52 may be machined or otherwise impressed onto surface 53 with the centerline of cavity 52 inclined at any selected angle to surface 53 in order to further minimize potential wetting of the cavity 52 walls by liquid 51, and the angle θ' illustrated in FIG. 5 may correspond to the contact angle of liquid 51. Rectangular slots can also be added of fixed width and length, and if the expected point of initial liquid contact with the heated surface is known, a series of annular ring trenches can be impressed in the surface around that point to entrap vapor within each ring.

Figure 6:
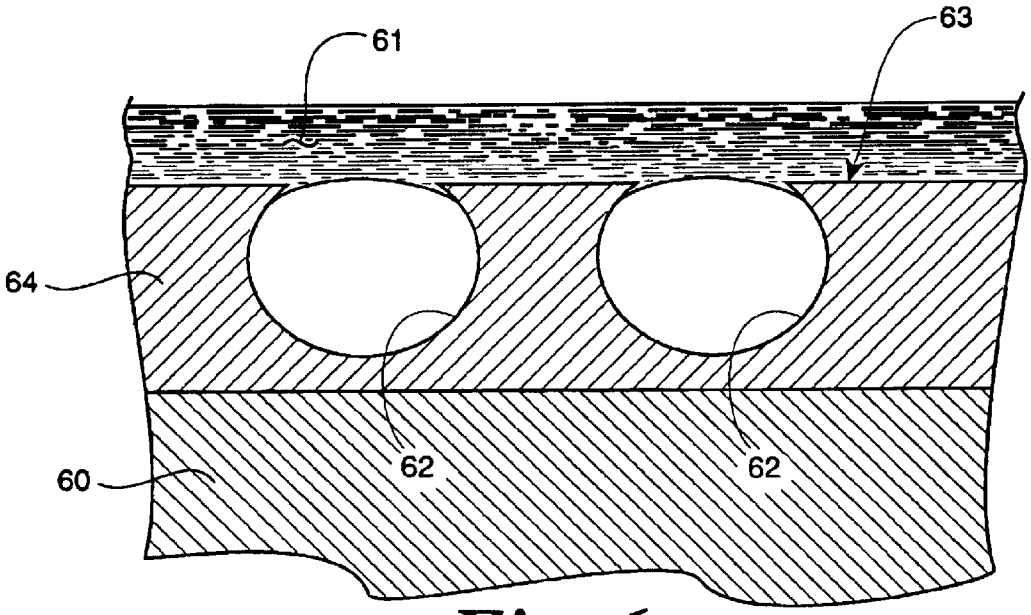
FIG. 6 shows in section another representative micro-cavity shape according to the invention.

Referring now to FIG. 6, a low cost method to manufacture the desired cavity features into the surface 63 of a structure 60 to be protected is suggested wherein a layer 64 of porous medium, such as thermally sprayed metals including steel, iron or others, is applied to surface 63 by powder metallurgy and sintering techniques well known in the applicable art, which may be precisely controlled to produce a distribution of pores of selectable diameter, within a tightly defined range of variability. Once applied, the outer surface of layer 64 may be machined or polished to expose open pores in the form of cavities 62. Only a small portion of the cavity 62 outer surface is exposed, and such re-entrant cavities promote minimal seepage of liquid because of the extreme angle of the inner pore walls relative to the contact angle of liquid 61. Because cavities 62 are needed only on surface 63 exterior, a very thin porous section can be applied in a one-step process to the outer surface 63 of the structure to be protected, or the entire structure 60 may be fabricated in this manner.

Surface coatings can also be added in these processes to inhibit wicking and wetting of the pore or cavity walls. These coatings (such as TEFLON) effectively increase the contact angle between the liquid and the coating material (as opposed to the uncoated surface), which in turn reduces the degree of liquid seepage and heating within the cavities.

Coatings may also be applied to fill the cavities with substances well known to those skilled in the art that have lower thermal conductivities than air to further reduce heat transfer to the liquid suspended over the cavities. These substances also inhibit any seepage of liquid and the associated additional heat transfer, but may inhibit the desired heat expelling capability of the structure (if such is important) during normal operation. The substances could be spread over the surface and allowed to seep inside (possibly by the application of pressure), then wiped off the surface exterior to allow retention of the coating only within the cavity interiors. This process could be performed in an automated process by those skilled in the appropriate art. An example of such materials are the aerogel class of materials such as disclosed in U.S. Pat. No. 6,068,882 by Ryu, the entire teachings of which are incorporated by reference herein. Aerogels are an extremely porous and light form of glass (silica) formed in a special process to result in internal pores of nanometer scale. These materials have roughly a third of the conductivity of air (0.015 w/mK versus 0.055 w/mK for air at 750° K), and less than 10 times the density of air (3.0 kg/m$^3$ versus 0.46 kg/m$^3$ for air at 750° C., but roughly three times as much at 300° K), such weight addition being negligible.

The entire teachings of all references cited herein are hereby incorporated by reference.

The invention therefore provides a structure for housing, enclosing or supporting hot operating machinery that mitigates the ignition of flammable fluids coming in contact with the machinery. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A structural element for enclosing or supporting hot operating machinery, comprising:

(a) a structural member for enclosing or supporting a hot operating machinery; and (b) means defining a plurality of micro-cavities of preselected width and or preselected depth less than the thickness of said structural member on the outer surface of said structural member for mitigating ignition of a flammable liquid that comes into contact with said structural member, said micro-cavities being about one millimeter in width to minimize seepage of the liquid into said micro-cavities because of the surface tension of the liquid.

2. The structural element of claim 1 wherein said micro-cavities are in the form of holes of selected shape defined in the surface of said structural member.

3. The structural element of claim 1 wherein said micro-cavities are in the form of grooves defined in the surface of said structural member.

4. The structural element of claim 2 wherein the centerline of said holes is non-perpendicular to said surface of said structural member.

* * * * *